(12) United States Patent
Snider

(10) Patent No.: US 10,465,758 B2
(45) Date of Patent: Nov. 5, 2019

(54) ROTATABLE SHAFT WITH FLUID ACTUATED LOCK PISTON

(71) Applicant: Ingersoll-Rand Company, Davidson, NC (US)

(72) Inventor: Stephen Snider, Kent, WA (US)

(73) Assignee: Ingersoll-Rand Company, Davidson, NC (US)

( * ) Notice: Subject to any disclaimer, the term of this patent is extended or adjusted under 35 U.S.C. 154(b) by 36 days.

(21) Appl. No.: 15/660,433

(22) Filed: Jul. 26, 2017

(65) Prior Publication Data

US 2019/0032734 A1  Jan. 31, 2019

(51) Int. Cl.
```
F16D 63/00    (2006.01)
F16D 65/16    (2006.01)
B60T 1/00     (2006.01)
B60T 1/06     (2006.01)
F16H 63/30    (2006.01)
F16H 63/34    (2006.01)
F16H 63/48    (2006.01)
F16D 121/06   (2012.01)
F16D 121/14   (2012.01)
F16D 125/02   (2012.01)
F16D 125/06   (2012.01)
```

(52) U.S. Cl.
CPC .......... *F16D 63/006* (2013.01); *B60T 1/005* (2013.01); *B60T 1/062* (2013.01); *F16D 65/16* (2013.01); *F16H 63/3023* (2013.01); *F16H 63/3026* (2013.01); *F16H 63/34* (2013.01); *F16H 63/3416* (2013.01); *F16H 63/3441* (2013.01); *F16H 63/3483* (2013.01); *F16H 63/483* (2013.01); *F16D 2121/06* (2013.01); *F16D 2121/14* (2013.01); *F16D 2125/023* (2013.01); *F16D 2125/06* (2013.01); *F16H 2063/3033* (2013.01)

(58) Field of Classification Search
CPC .... F16D 63/006; F16D 65/16; F16D 2121/06; F16D 2121/14; F16D 2125/023; F16D 2125/06
See application file for complete search history.

(56) References Cited

U.S. PATENT DOCUMENTS

| | | |
|---|---|---|
| 3,508,450 A | 4/1970 | Richards |
| 3,690,426 A | 9/1972 | Weisgerber |
| 4,023,654 A | 5/1977 | Winzeler |
| 4,645,039 A | 2/1987 | Lewis et al. |

(Continued)

FOREIGN PATENT DOCUMENTS

| | | |
|---|---|---|
| EP | 2913550 A2 | 9/2015 |
| FR | 2235308 A1 | 1/1975 |

(Continued)

OTHER PUBLICATIONS

Extended European Search Report, European Patent Application No. 18185728.5, dated Nov. 29, 2018, 9 pages.

*Primary Examiner* — Melanie Torres Williams
(74) *Attorney, Agent, or Firm* — Taft Stettinius & Hollister LLP

(57) ABSTRACT

A system is disclosed for locking and unlocking a rotatable shaft connected to a drive motor. The system includes a fluid actuated lock piston operable to move between locked and unlocked positions to selectively lock the rotatable shaft to a fixed housing.

23 Claims, 4 Drawing Sheets

(56) References Cited

U.S. PATENT DOCUMENTS

| | | | |
|---|---|---|---|
| 4,736,675 A | 4/1988 | Stoll | |
| 4,736,821 A | 4/1988 | Ries | |
| 4,875,391 A | 10/1989 | Leising et al. | |
| 4,981,423 A | 1/1991 | Bissonnette | |
| 5,469,943 A | 11/1995 | Hill et al. | |
| 5,609,020 A | 3/1997 | Jackson et al. | |
| 6,301,811 B1 | 10/2001 | Gilmore, Jr. | |
| 6,315,097 B1 | 11/2001 | Burns | |
| 7,201,185 B2 | 4/2007 | Poppe et al. | |
| 8,360,917 B2 | 1/2013 | Nichols et al. | |
| 9,476,459 B2 | 10/2016 | Lemmers, Jr. | |
| 2014/0000992 A1* | 1/2014 | Tajima | F16D 65/18 188/72.1 |
| 2014/0023543 A1 | 1/2014 | Attarde et al. | |
| 2014/0102251 A1* | 4/2014 | Corsetti | B60K 6/48 74/665 A |

FOREIGN PATENT DOCUMENTS

| | | | |
|---|---|---|---|
| GB | 2117465 A | 10/1983 | |
| WO | 20050784 A1 | 8/2000 | |

* cited by examiner

ROTATABLE SHAFT WITH FLUID ACTUATED LOCK PISTON

TECHNICAL FIELD

The present invention generally relates to a system for selectively locking and unlocking a rotatable shaft and more particularly, but not exclusively to a system including a fluid actuated piston operable to lock and unlock a rotatable shaft.

BACKGROUND

Certain mechanical drive systems have rotatable shafts that are selectively locked and unlocked (i.e. prevented from rotating or permitted to rotate) as defined by an operating control system. Some existing drive shaft systems have various shortcomings relative to certain applications. Accordingly, there remains a need for further contributions in this area of technology.

SUMMARY

One embodiment of the present invention includes a unique fluid actuated lock piston selectively coupled with a rotatable shaft. Other embodiments include apparatuses, systems, devices, hardware, methods, and combinations for locking and unlocking rotatable shafts in systems with a fluid actuated lock piston. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
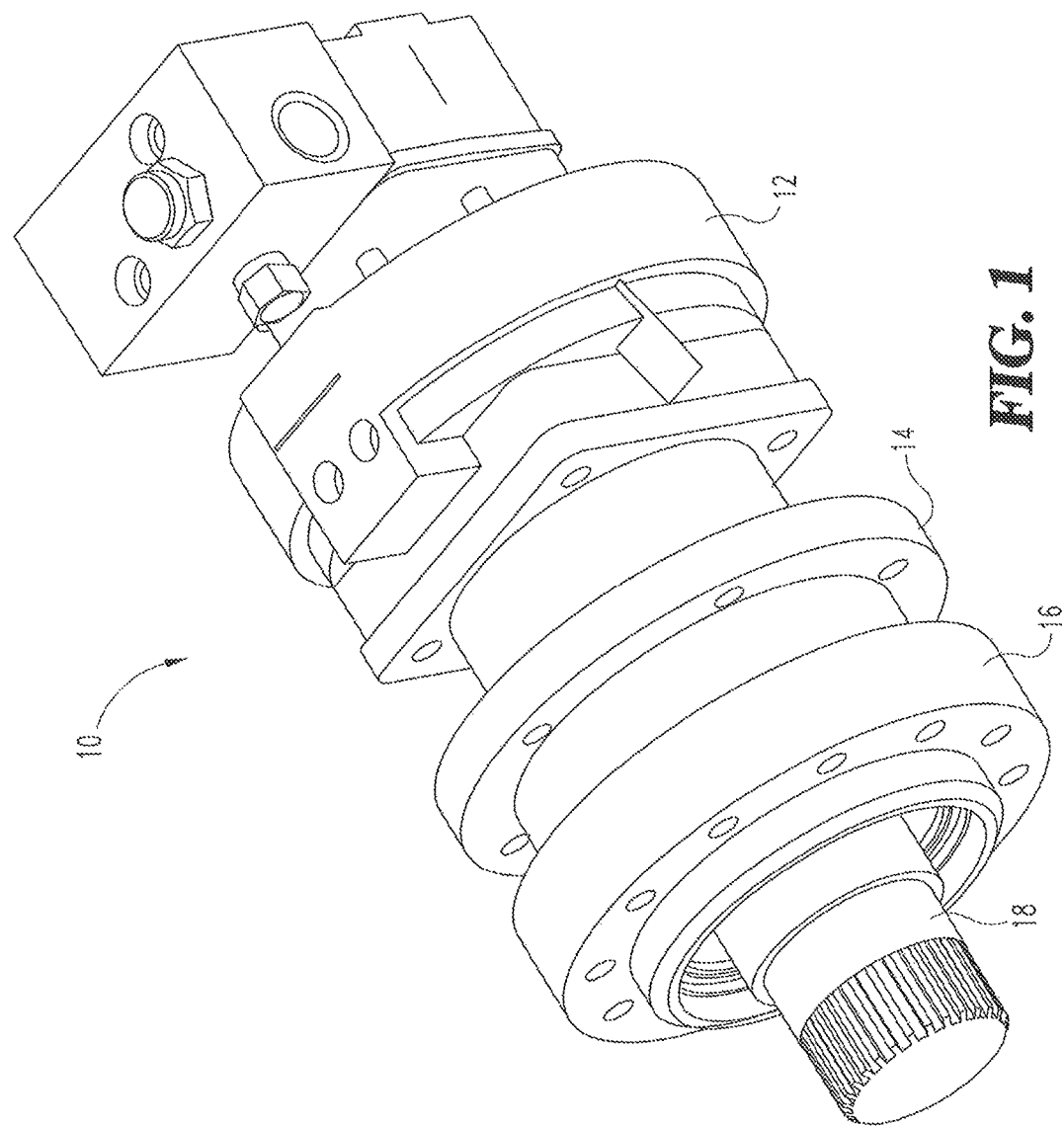
FIG. 1 is a perspective view of a portion of an exemplary system with a rotatable drive shaft.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Drive systems with rotating shafts are used to transmit mechanical power in a myriad of industrial applications. In some applications it can be desirable to selectively lock a rotatable drive shaft. By way of example and not limitation one such application can include a winch set up as a dual capacity device. In a dual capacity winch, a light load side must hold the heavy load torque, which requires a large brake. If the drive shaft can be locked directly to a winch frame to hold relatively heavy loads, then the motor/brake can be sized for the lighter loads which reduces system weight and manufacturing costs.

Referring now to FIG. 1, a portion of a drive shaft system assembly 10 is illustrated in perspective form. The drive shaft system assembly 10 can include a motor housing 12, a lock housing 14 coupled to the motor housing 12 and a bearing housing 16 to rotatably support a drive shaft 18.

Figure 2:
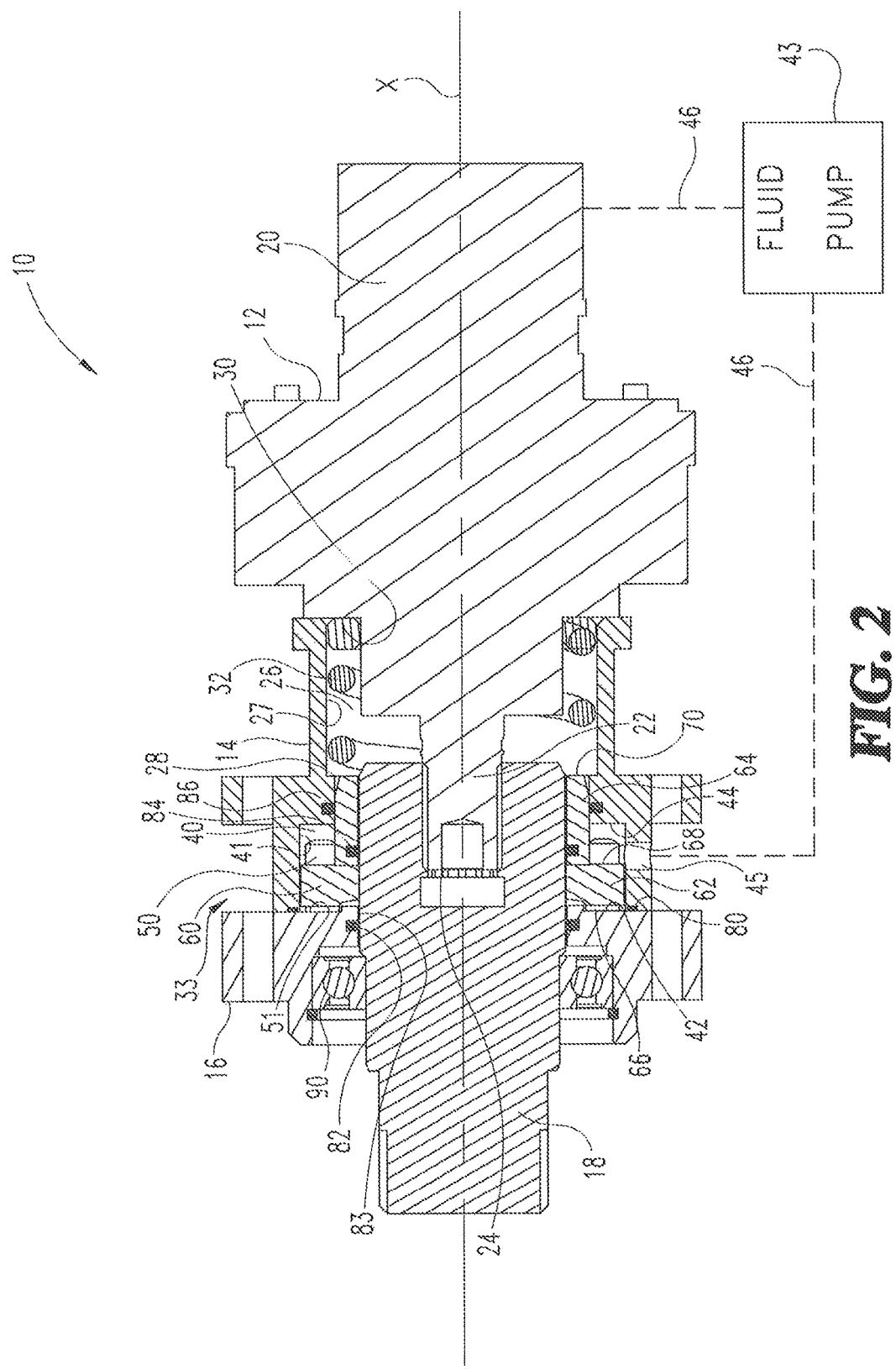
FIG. 2 is a cross-sectional view of the exemplary system of FIG. 1 with a lock piston in a locked position.
Figure 3:
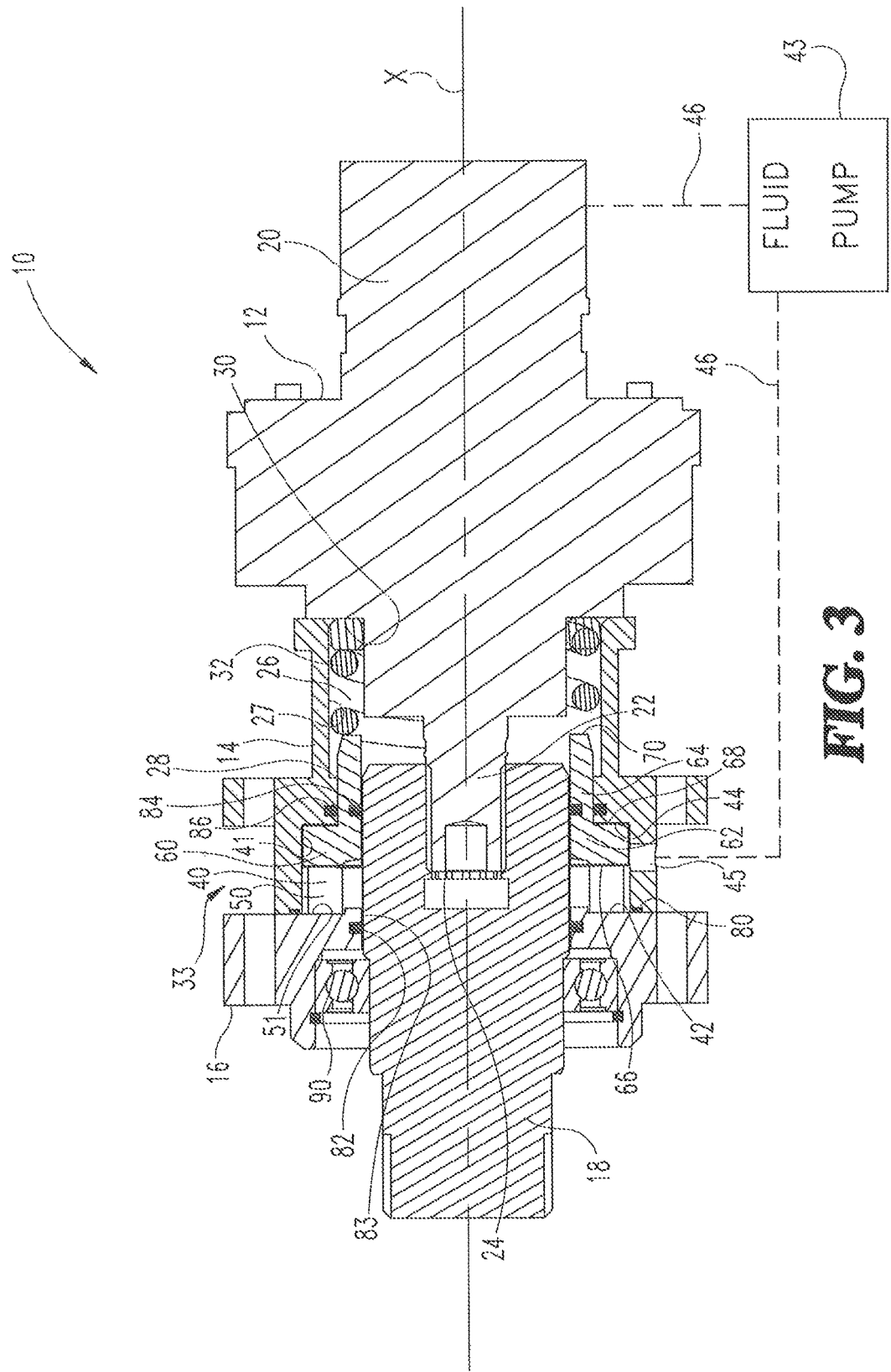
FIG. 3 is a cross-sectional view of the exemplary system of FIG. 1 with the lock piston in an unlocked position.

Referring now to FIGS. 2 and 3, a cross-sectional view of the drive shaft system assembly 10 is illustrated with the drive shaft 18 in a locked position and the drive shaft system assembly 10 in an unlocked position, respectively. The drive shaft system assembly 10 can include a motor 20 operable for rotatably driving the drive shaft 18 when the drive shaft 18 is in an unlocked condition. The motor 20 can be of any form, but typically can include electric and/or hydraulic power. The motor 20 can include a motor shaft 22 operably coupled within a coupling bore 24 formed at one end of the drive shaft 18. The lock housing 14 can be connected to the motor housing 12 and in some forms can be directly connected thereto. A spring chamber 26 can be formed within the lock housing 14 internal to an inner wall 27 of the lock housing 14. The spring chamber 26 extends between a first end 28 and a second end 30 located adjacent the motor housing 12. A resilient member such as a coil spring 32 or the like is disposed around a portion of the motor shaft 22 within the spring chamber 26. The resilient member 32 is operable to urge the lock mechanism into a locked position relative to the drive shaft 18. This will be described in more detail below.

The lock housing 14 also includes a pressure chamber 40 disposed internal to an inner wall 41 of the lock housing 14 adjacent to the bearing housing 16. The pressure chamber 40 extends substantially along an axial direction defined by the rotational axis X between a first end 42 and a second end 44. The pressure chamber 40 includes a pressure chamber inlet 45 configured to transfer pressurized fluid into the pressure chamber 40. In some forms the pressure chamber inlet 45 can act as an outlet when pressure or fluid flow is discharged from the pressure chamber 40. A plurality of guide pins 50 extend from a side wall 51 of the bearing housing 16 into the pressure chamber 40 generally in the axial direction X. The guide pins 50 may be cylindrical in shape as shown, but may be defined by other configurations in alternate embodiments. A lock piston 60 is positioned within the pressure chamber 40 and is constructed to move between first and second positions corresponding to a locked position and an unlocked position respectively. The guide pins 50 provide structure for the lock piston 60 to follow when moving between the locked and unlocked positions. The lock piston 60 prevents the drive shaft 18 from rotating when in the locked position.

The pressure chamber inlet 45 is in fluid communication with a pressurized fluid source such as a fluid pump 43 or the like. In some forms, the fluid pump 43 can be a pumping apparatus in fluid communication with the motor 20. In other forms, pressurized fluid may be pumped through conduits unconnected with the motor 20. The working fluid may be oil, hydraulic fluid, air or other types and/or mixtures known to one skilled in the art. The fluid pump 43 may pump fluid through one or more fluid conduits 46 to transfer fluid from a source (not shown) to the inlet 42. In some embodiments pressurized fluid may be pumped internally through passages (not shown) in one or more housings of the drive shaft assembly 10.

The lock piston 60 includes a plurality of lugs 62 extending outward from a lock piston bore 64. Each piston lug 62 includes a first face 66 located adjacent the bearing housing 16 and a second face 68 positioned on an opposing side of the piston lug 62. The lock piston bore 64 is a cylindrical bore that is configured to engage around the drive shaft 18 and selectively permit relative rotation and axial movement therebetween. The lock piston bore 64 includes a bore face 70 positioned at a distal end away from the lugs 62. The bore face 70 is configured to engage with the spring 32 located in the adjacent spring chamber 26. The coil spring 32 engages with the bore face 70 of the lock piston 60 to urge the lock piston 60 toward a locked position when the pressure chamber 40 is depressurized.

In operation, pressurized fluid is pumped into the pressure chamber 40 to move the lock piston 60 from the locked position to the unlocked position. The fluid pressure will generate a pressure force on the first face 66 of the lugs 62 sufficient to overcome the force of the spring 26 and move the lock piston 60 to the second or unlocked position as shown in FIG. 3. In the unlocked position, the drive shaft 18 can rotate within the lock housing 14 and the bearing housing 16 when a motor torque is applied. A bearing mechanism 90 can be located within bearing housing 16 to rotatably support the shaft 18 within the assembly 10.

The pressure chamber 40 is sealed by a plurality of seal members some of which may be static seals and some are movable relative to the sealing interface either rotationally and/or in an axially sliding manner. A lock housing seal 80 can be positioned between the lock housing 14 and the bearing housing 16 to seal an interface formed therebetween. A bearing housing seal 82 is located between an inner wall 83 of the bearing housing 16 and the drive shaft 18. The bearing housing seal 82 maintains a sealed interface both when the shaft is locked or rotated. An inner bore seal 84 is positioned between the drive shaft 18 and the lock piston 60. The inner bore seal 84 maintains a sealed interface when the lock piston 60 is static or sliding between locked and unlocked positions. An outer bore seal 86 is positioned between the bore 64 of the lock piston 60 and lock housing 14. The outer bore seal 86 maintains a sealed interface when the lock piston 60 is static or sliding between locked and unlocked positions.

Figure 4:
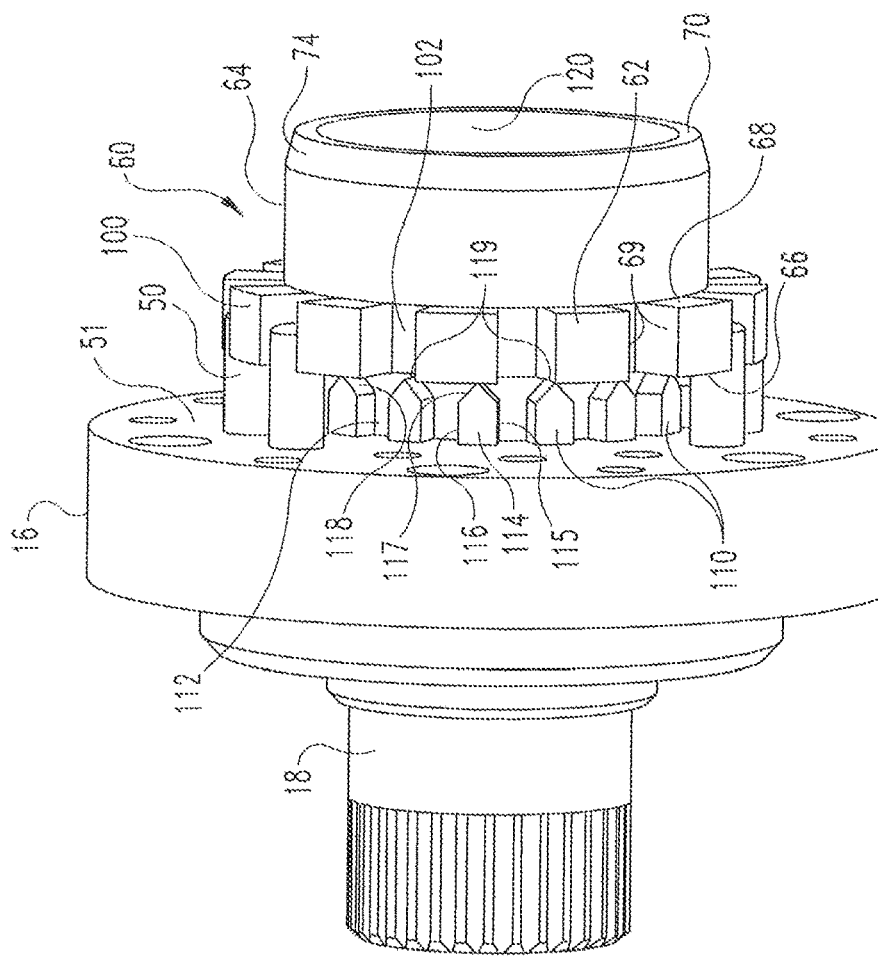
FIG. 4 is a perspective view of a portion of the system of FIG. 1 illustrating the lock piston in an unlocked position.

Referring now to FIG. 4, a perspective view with a portion of the drive shaft 18, bearing housing 16 and lock piston 60 is illustrated. The lock piston 60 is shown in a second or unlocked position relative to the drive shaft 18. Each piston lug 62 projects radially outward from the piston bore 64 and includes an outer wall 100 extending between the first lug face 66 and the second lug face 68. A guide slot 102 is formed between sidewalls 69 of each adjacent pair of locking lugs 62. Each guide slot 102 is configured to receive a corresponding guide pin 50 which extends from a side wall 51 of the bearing housing 16. In some forms the guide slot 102 is substantially configured to correspond with a shape of the guide pins 50. For example, the sidewalls 69 may be arcuate in shape to provide a close fit with a cylindrically shaped pin 50. Other shapes for the pins 50 and lugs 62 are contemplated herein. The lock piston 60 includes an inner circumferential wall 120 formed within the piston bore 64. A chamfered edge 74 can be formed at one end of the piston bore 64 and terminated at the bore face 70.

The drive shaft 18 includes an outer circumferential wall 112 that includes a plurality of key splines 110 projecting radially outward therefrom. The drive shaft key splines 110 can include an outer wall 114 extending between a pair of sidewalls 115, 116 that transition to angled end walls 117, 118 that intersect to define a tip 119 projecting away from sidewall 51 of the bearing housing 16.

Figure 5:
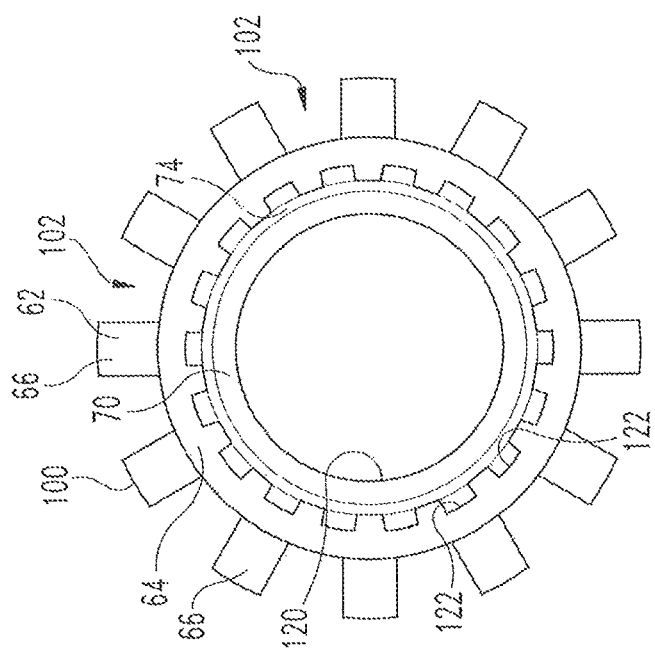
FIG. 5 is an end view of the lock piston.

Referring now to FIG. 5, an end view of the lock piston 60 is shown. The lock piston 60 includes a plurality of grooves 122 projecting radially outward from the inner circumferential wall 120. Each of the grooves 122 of the lock piston 60 correspond in size and shape with a key spline 110 projecting from the drive shaft 18 such that the grooves 122 can slidingly receive the key splines 110 when the lock piston 60 moves from an unlocked position to a locked position. The lock piston 60 locks the drive shaft 18 when located in the first position such that the first face 66 of each of the lugs 62 are directly adjacent the side wall 51 of the bearing housing 16. In the locked position, each of the guide pins 50 are engaged within a corresponding guide slot 102 of the lock piston 60 and the key splines 110 of the drive shaft 18 are engaged within the grooves 122 of the lock piston 60. The engaged guide pins 50 will prevent rotation of the lock piston 60 relative to the bearing housing 16 and the engaged key splines 110 will prevent rotation of the drive shaft 18 relative to the lock piston 60.

When the pressure chamber 40 (see FIGS. 2 and 3) is pressurized with pressurized fluid, the hydraulic force of the fluid will act to move the lock piston 60 to the unlocked position. When the hydraulic pressure exceeds a threshold force on the lock piston 60 that is sufficient to overcome the force of the spring 32 within the spring chamber 26, then the lock piston 60 will move from the locked to the unlocked position, thereby disengaging the lock piston 60 from the shaft 18 and the guide pins 50. In the unlocked position, the drive shaft 18 can be rotated when a torque is transmitted from the motor 20 through the motor shaft 22 and into the coupling bore 24 of the drive shaft 18.

In one aspect, the present disclosure includes a system comprising: a lock housing having an internal region; a rotatable shaft having a coupling bore extending into the internal region of the lock housing; a pressure chamber formed within the internal region of the lock housing; a lock piston positioned within the pressure chamber, the lock piston operable for selectively locking the rotatable shaft; and a fluid pump in fluid communication with the pressure chamber.

In refining aspects, the lock piston is engaged about a portion of the rotatable shaft; wherein the lock piston is moveable between first and second positions; and wherein the rotatable shaft is locked when the piston is in the first position and unlocked when the piston is in the second position; further comprising a resilient member engageable with the lock piston to urge the lock piston toward the first position; wherein pressurized fluid is discharged from the pump into the pressure chamber such that a net hydraulic force causes the lock piston to move from the first position to the second position; further comprising: a bearing housing positioned adjacent the lock housing; and a bearing assembly located within the bearing housing configured to rotatably support the rotatable shaft; further comprising a plurality guide pins extending from a side wall of the bearing housing; wherein lock piston includes: a cylindrical bore engaged around the coupling bore of the shaft; a plurality of lugs extending radially outward from the cylindrical bore, each lug having an outer perimeter wall with an opposing first face and second face extending between the outer perimeter wall and the cylindrical bore; and a guide slot formed between each adjacent pair of lugs; wherein each of the guide pins of the bearing housing slidingly engage within a corresponding guide slot of the lock piston as the lock piston moves between first and second positions; further comprising a motor operably coupled to the rotatable shaft; wherein the rotatable shaft includes a plurality of key splines protruding radially outward around an outer circumferential wall; and wherein the lock piston includes a plurality of grooves formed on an inner circumferential wall, each groove configured to slidingly receive a corresponding key spline when the lock piston is in a locked position.

Another aspect of the present disclosure includes a method comprising: inserting a rotatable shaft within a lock housing; rotatably supporting the rotatable shaft in a bearing housing adjacent the lock housing; positioning a lock piston around a portion of the rotatable shaft within a pressure chamber located within the lock housing, the lock piston movable between first and second positions within the pressure chamber; pumping pressurized fluid into the pressure chamber; and moving the lock piston from the first position to the second position in response to the pumping of the pressurized fluid into the pressure chamber.

In refining, aspects, the method includes locking the rotatable shaft when the lock piston is in the first position; unlocking the rotatable shaft when the lock piston is in a second position; and moving the lock piston from the second position to the first position with a resilient member when the pressure chamber is depressurized; rotating the rotatable shaft with a motor when the lock piston is the second position.

Another aspect of the present disclosure includes an apparatus comprising: a motor coupled to a rotatable shaft; a bearing housing having a bearing assembly configured to rotatably support the rotatable shaft; a lock housing connected to the bearing housing; a pressure chamber formed within the lock housing; a source of pressurized fluid in fluid communication with the pressure chamber; and a lock piston positioned within the pressure chamber, the lock piston configured to move to from a first position to a second position when pressurized fluid is pumped into the pressure chamber.

In refining aspects, the apparatus further comprises a fluid pump operable for pumping pressurized fluid into the pressure chamber; a resilient member operable for urging the lock piston toward the first position when the pressure chamber is depressurized; a plurality of guide pins extending from the bearing housing into the pressure chamber of the lock housing; wherein the lock piston further comprises: a piston bore configured to receive a portion of the rotatable shaft internally thereto; a plurality of lugs extending radially outward from the piston bore; and a guide slot formed between each adjacent pair of lug; wherein each guide slot slidingly engages along a length of a corresponding pin when the lock housing moves between locked and unlocked positions; wherein the rotatable shaft includes a plurality of key splines positioned about an outer circumferential wall; wherein the lock piston includes a plurality of internal grooves formed within the piston bore configured to slidingly receive the key splines when the lock piston is moved from the second position to the first position; wherein the motor is a hydraulic motor in fluid communication with the pressure chamber.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system comprising:
   a lock housing having an internal region;
   a rotatable shaft having a coupling bore extending into the internal region of the lock housing;
   a pressure chamber formed within the internal region of the lock housing;
   a lock piston positioned within the pressure chamber, the lock piston operable for selectively locking the rotatable shaft; and
   a fluid pump in fluid communication with the pressure chamber;
   wherein the rotatable shaft includes a plurality of key splines protruding radially outward around an outer circumferential wall.

2. The system of claim 1, wherein the lock piston is engaged about a portion of the rotatable shaft.

3. The system of claim 1, wherein the lock piston is moveable between first and second positions; and
   wherein the rotatable shaft is locked when the piston is in the first position and unlocked when the piston is in the second position.

4. The system of claim 3 further comprising a resilient member engageable with the lock piston to urge the lock piston toward the first position.

5. The system of claim 3, wherein pressurized fluid is discharged from the pump into the pressure chamber such that a net hydraulic force causes the lock piston to move from the first position to the second position.

6. The system of claim 1 further comprising:
   a bearing housing positioned adjacent the lock housing; and
   a bearing assembly located within the bearing housing configured to rotatably support the rotatable shaft.

7. The system of claim 6 further comprising a plurality guide pins extending from a side wall of the bearing housing.

8. The system of claim 7, wherein lock piston includes:
   a cylindrical bore engaged around the coupling bore of the shaft;
   a plurality of lugs extending radially outward from the cylindrical bore, each lug having an outer perimeter wall with an opposing first face and second face extending between the outer perimeter wall and the cylindrical bore; and
   a guide slot formed between each adjacent pair of lugs.

9. The system of claim 8, wherein each of the guide pins of the bearing housing slidingly engage within a corresponding guide slot of the lock piston as the lock piston moves between first and second positions.

10. The system of claim 1, further comprising a motor operably coupled to the rotatable shaft.

11. The system of claim 1, wherein the lock piston includes a plurality of grooves formed on an inner circumferential wall, each groove configured to slidingly receive a corresponding key spline when the lock piston is in a locked position.

12. A method comprising:
inserting a rotatable shaft within a lock housing;
rotatably supporting the rotatable shaft in a bearing housing adjacent the lock housing;
positioning a lock piston around a portion of the rotatable shaft within a pressure chamber located within the lock housing, the lock piston movable between first and second positions within the pressure chamber such that the lock piston engages and disengages a guide pin that extends from a side wall of the bearing housing;
pumping pressurized fluid into the pressure chamber; and
moving the lock piston from the first position to the second position in response to the pumping of the pressurized fluid into the pressure chamber.

13. The method of claim 12 further comprising:
locking the rotatable shaft when the lock piston is in the first position; and
unlocking the rotatable shaft when the lock piston is in a second position.

14. The method of claim 12 further comprising moving the lock piston from the second position to the first position with a resilient member when the pressure chamber is depressurized.

15. The method of claim 12, rotating the rotatable shaft with a motor when the lock piston is the second position.

16. An apparatus comprising:
a motor coupled to a rotatable shaft;
a bearing housing having a bearing assembly configured to rotatably support the rotatable shaft;
a lock housing connected to the bearing housing;
a pressure chamber formed within the lock housing;
a source of pressurized fluid in fluid communication with the pressure chamber;
a lock piston positioned within the pressure chamber, the lock piston configured to move to from a first position to a second position when pressurized fluid is pumped into the pressure chamber; and
a plurality of guide pins extending from the bearing housing into the pressure chamber of the lock housing.

17. The apparatus of claim 16 further comprising a fluid pump operable for pumping pressurized fluid into the pressure chamber.

18. The apparatus of claim 16 further comprising a resilient member operable for urging the lock piston toward the first position when the pressure chamber is depressurized.

19. The apparatus of claim 16, wherein the lock piston further comprises:
a piston bore configured to receive a portion of the rotatable shaft internally thereto;
a plurality of lugs extending radially outward from the piston bore; and
a guide slot formed between each adjacent pair of lugs.

20. The apparatus of claim 19, wherein each guide slot slidingly engages along a length of a corresponding pin when the lock housing moves between locked and unlocked positions.

21. The apparatus of claim 16, wherein the rotatable shaft includes a plurality of key splines positioned about an outer circumferential wall.

22. The apparatus of claim 21, wherein the lock piston includes a plurality of internal grooves formed within the piston bore configured to slidingly receive the key splines when the lock piston is moved from the second position to the first position.

23. The apparatus of claim 16, wherein the motor is a hydraulic motor in fluid communication with the pressure chamber.

* * * * *